United States Patent [19]

Yip

[11] Patent Number: 6,151,366

[45] Date of Patent: Nov. 21, 2000

[54] METHOD AND APPARATUS FOR MODULATING SIGNALS

[75] Inventor: Philip Chu Wah Yip, Austin, Tex.

[73] Assignee: Advanced MicroDevices, Inc., Austin, Tex.

[21] Appl. No.: 09/062,253

[22] Filed: Apr. 17, 1998

[51] Int. Cl.[7] .................................................. H04L 27/12
[52] U.S. Cl. .......................................... 375/305; 332/100
[58] Field of Search .................................... 375/295, 309, 375/305, 303, 302, 274; 332/100

[56] References Cited

U.S. PATENT DOCUMENTS

| | | | |
|---|---|---|---|
| 3,988,674 | 10/1976 | Sciulli | 370/505 |
| 4,466,029 | 8/1984 | Tanaka | 360/72.2 |
| 5,602,848 | 2/1997 | Andrews et al. | 370/465 |
| 5,611,075 | 3/1997 | Garde | 711/153 |
| 5,778,024 | 7/1998 | McDonough | 375/216 |

OTHER PUBLICATIONS

"A 270–kb/s 35–m W Modulator IC for GSM Cellular Radio hand–Held Terminals", by Johan J. J. Haspeslagh, Danny Sallaerts, Peter P. Reusens, Arnoul Vanwelsenaers, R. Granek, and Dirk Rabaey, IEEE Journal of Solid–State Circuits, vol. 25, No. 6, Dec. 1990.

"Efficient Implementation of an I–Q GMSK Modulator", by Alfredo Linz & Alan Hendrickson, IEE Transactions on Circuits and Systems—II: Analog and Digital Signal Processing, vol. 43, No. 1, Jan. 1, 1996.

*Primary Examiner*—Stephen Chin
*Assistant Examiner*—Lenny Jiang
*Attorney, Agent, or Firm*—Williams, Morgan & Amerson, P.C.

[57] ABSTRACT

A signal modulator includes a digital signal processor, an address buffer, a counter, and a first memory device. The digital signal processor is adapted to receive digital data at a receive sampling rate and define a code word based on a subset of the digital data. The address buffer is coupled to the digital signal processor and adapted to receive the code word and store a base address. The counter is adapted to increment an address offset at a transmit sampling rate. The transmit sampling rate is a multiple of the receive sampling rate. The first memory device has a plurality of memory locations and is adapted to receive the base address and the address offset and provide a first waveform data sample from the memory location addressed by the base address and the address offset. A method for modulating a signal includes receiving digital data at a receive sampling rate. The time interval between digital data samples defines a bit interval. A code word is determined based on a subset of the digital data. A counter is initialized at the start of the bit interval. The counter is incremented at a transmit sampling rate. An address is determined based on the code word and an address offset stored in the counter. A first memory device containing waveform data is accessed based on the address. A first waveform data sample is output from the first memory device.

44 Claims, 2 Drawing Sheets

METHOD AND APPARATUS FOR MODULATING SIGNALS

BACKGROUND OF THE INVENTION

1. Field of the Invention

This invention relates generally to modulating signals, and more particularly, to a method and apparatus for modulating a signal using gaussian filtered minimum shift keying with a flexible sampling rate.

2. Description of the Related Art

The proliferation of digital devices has increased demand for wireless transmission of binary or digital data. Binary data includes sharp transitions between logic levels, such as from zero to one and one to zero, resulting in a signal having harmonic content requiring considerable bandwidth. One method for reducing the bandwidth requirement is pre-modulation filtering, which involves translating the data bits into a particular combination of phase, frequency, or amplitude prior to modulating an RF carrier with the digital data. One such pre-modulation technique is gaussian filtered minimum shift keying (GMSK), where a gaussian filter is used to reduce the harmonic content of the modulated signal, thus reducing the required bandwidth.

Previous GMSK techniques are inflexible and require complex hardware. Changes in parameters, such as the sampling frequency of the transmitted signal, require wide scale hardware changes. For example, consider a system receiving data for transmission at a particular receive sampling rate. The interval between digital data bits is referred to as the bit interval. The system must generate a number of samples per bit interval to generate the baseband signal. The rate at which samples are generated for the transmitted data is referred to as the transmit sampling rate. The digital signal processor must supply data at the transmit sampling rate. If the desired transmit sampling rate is changed, the digital signal processor must be reconfigured to supply data at the new desired transmit sampling frequency. This increases the demand on the digital signal processor, and at high transmit sampling rates, may decrease its performance. Such an arrangement is inflexible and costly to adapt to varied operating conditions.

The present invention is directed to overcoming, or at least reducing the effects of, one or more of the problems set forth above.

SUMMARY OF THE INVENTION

In one aspect of the present invention, a signal modulator is provided. The signal modulator includes a digital signal processor, an address buffer, a counter, and a first memory device. The digital signal processor is adapted to receive digital data at a receive sampling rate and define a code word based on a subset of the digital data. The address buffer is coupled to the digital signal processor and adapted to receive the code word and store a base address. The counter is adapted to increment an address offset at a transmit sampling rate. The transmit sampling rate is a multiple of the receiving sampling rate. The first memory device has a plurality of memory locations and is adapted to receive the base address and the address offset and provide a first waveform data sample from the memory location addressed by the base address and the address offset.

In another aspect of the present invention, a method for modulating a signal is provided. The method includes receiving digital data at a receive sampling rate. The time interval between digital data samples defines a bit interval. A code word is determined based on a subset of the digital data. A counter is initialized at the start of the bit interval. The counter is incremented at a transmit sampling rate. An address is determined based on the code word and an address offset stored in the counter. A first memory device containing waveform data is accessed based on the address. A first waveform data sample is output from the first memory device.

BRIEF DESCRIPTION OF THE DRAWINGS

The invention may be best understood by reference to the following description taken in conjunction with the accompanying drawings, in which like reference numerals identify like elements, and in which.

Figure 1:
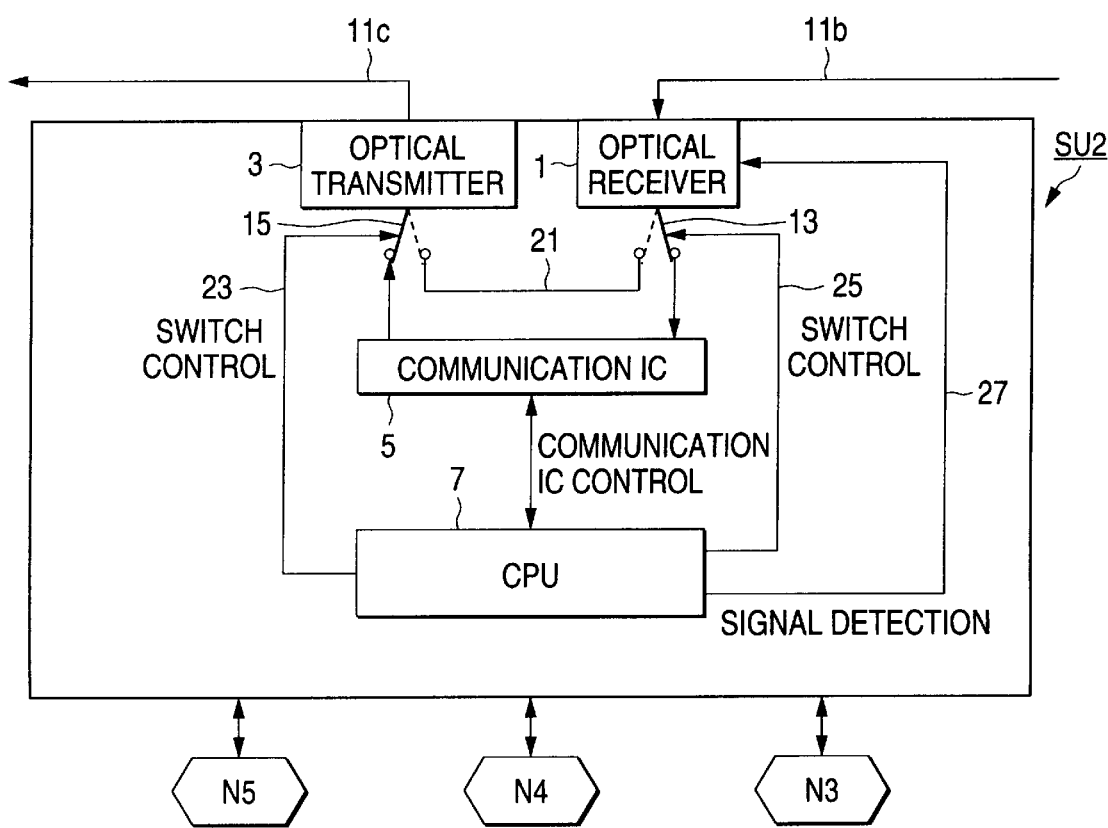
FIG. 1 is a block diagram of a communications system of the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Referring to FIG. 1, a block diagram of a communications system 10 of the present invention is shown. A transmitting device 15 includes a data generator 20 for providing a stream of digital data, and a signal modulator 25 for modulating an RF signal with the digital data from the signal modulator 20. A receiving device 30 receives the modulates signal and demodulates the signal in a demodulator 35.

The transmitting device 15 and receiving device 30 may have a number of applications. For example, the transmitting device is a handset (not shown) for a wireless phone (not shown), and the receiving device 30 is the base station (not shown) for the phone. Also, the transmitting device 15 may be a cellular phone or a modem (not shown). In the case where the transmitting device 15 is a modem, the modem may be wireless, or alternatively, the modem may transmit the modulated signal over a phone line (not shown). These applications for the transmitting device 15 and the receiving device 30 are provided for exemplary purposes. It is contemplated that the transmitting device 15 may be any device adapted to modulate a carrier signal with digital data.

For illustrative purposes, the following description is directed to the application of a wireless telephone, where the transmitting device 15 is the handset.

The waveform equation for the modulated wave form is:

$$S(t) = \text{Re}\{e^{j\omega_c t} \cdot e^{j\theta(t)}\} = \quad (1)$$
$$\cos(\omega_c t + \theta(t)) = \cos(\theta(t))\cos(\omega_c t) - \sin(\theta(t))\cos(\omega_c t)$$

where $\omega_c$ is the carrier frequency, and $\theta(t)$ is the phase function for the digital data, given by the equation:

$$\theta(t) = \frac{\pi}{2} \sum \alpha_i g(t - iT). \quad (2)$$

The digital data is represented by the equation:

$$\alpha_i = 1 - 2(d_i \oplus d_{i-1}) (\oplus = \text{exclusive OR}), \quad (3)$$

where $d_i$ is a current digital bit (one or zero) and $d_{i-1}$ is the previous digital bit (one or zero). Accordingly, $\alpha_1$ can have a value of 1 or −1. The gaussian transfer function, $g(t)$ is represented by the equation:

$$g(t) = \int_{-\infty}^{t} h(\tau) * \text{rect}\left(\frac{1}{T}\right) d\tau, \quad (4)$$

where $$h(t) = \frac{1}{\sqrt{2\pi} \cdot \sigma \cdot T} \cdot e^{(-t^2/2\sigma^2 T^2)}, \quad (5)$$

$$\sigma = \sqrt{\frac{\ln(2)}{2\pi \cdot B \cdot T}} (B \cdot T) = 0.3, \quad (6)$$

and $$\text{rect}\left(\frac{1}{T}\right) = \frac{1}{T} \text{ if } |T| < \frac{T}{2} \text{ and } \text{rect}\left(\frac{1}{T}\right) = 0 \text{ otherwise.} \quad (7)$$

The gaussian transfer function is integrated to generate an area function defined by:

$$Q(t) = \int_{-\infty}^{t} g(\tau) d\tau \quad (8)$$

Figure 2:
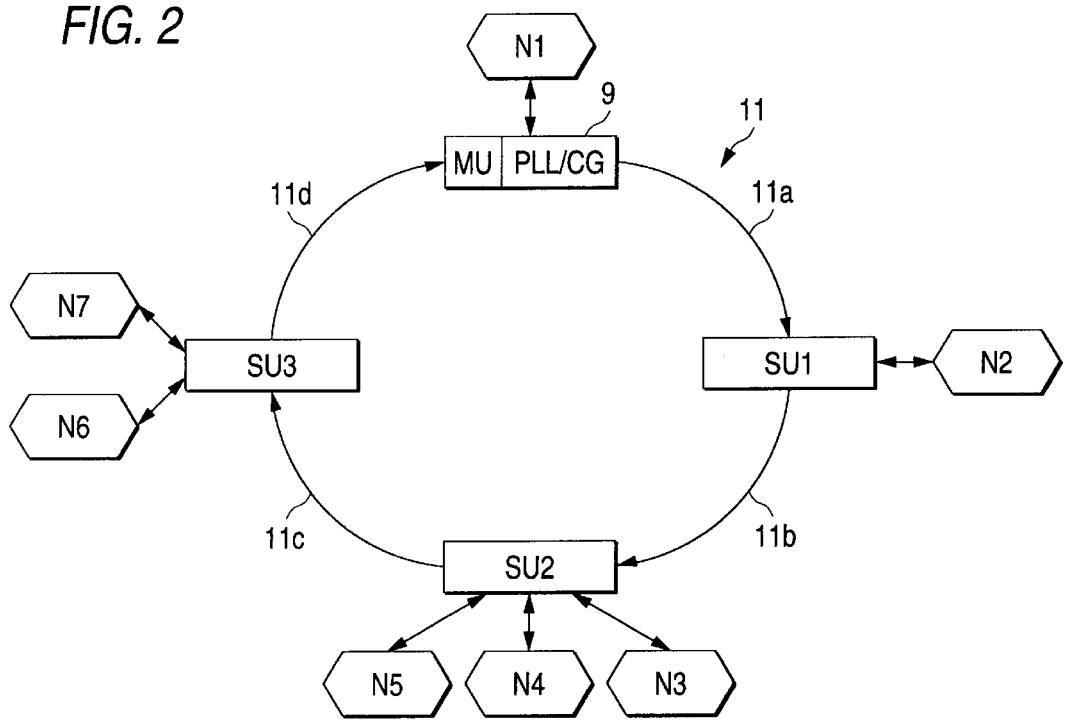
FIG. 2 is a graph of the area beneath a gaussian transfer function used by the signal modulator of FIG. 1.

The area function defined by $Q(t)$ is shown in FIG. 2. Note that after 3T the value of the area function, $Q(t)$, is essentially 1.

The continuous time waveform equation for the phase portion of Equation 1 related to the digital data is given by the following equation:

$$e^{j\theta(t)} = e^{j\frac{\pi}{2}\sum \alpha_i Q(t-iT)} \quad (9)$$

Expanding equation 9 for discrete time yields the equation:

$$e^{j\theta(kT)} = e^{j\frac{\pi}{2}\left\{\begin{array}{c}\alpha_{k-2}Q(2T)+\alpha_{k-1}Q(T)+\alpha_k Q(0)+\\ \alpha_{k+1}Q(-T)+\alpha_{k+2}Q(-2T)\end{array}\right\}} \cdot b_k \quad (10)$$

where the multiplication factor $b_k$ at the end of Equation 10 defines a complex scaling factor:

$$b_k = \alpha_{-2} \cdot \alpha_{-1} \cdot \alpha_0 \ldots \alpha_{k-3} \cdot j^k \text{ e.g., } b_k \in \{\pm j, \pm 1\}. \quad (11)$$

Equation 10 represents the values of the waveform equation at k intervals corresponding to the bit interval of the transmitted digital data. The $0^{th}$ term represents the first valid bit of the bit stream generated by the data generator 20. The $-1^{st}$ and $-2^{nd}$ terms do not represent valid bits and may be set at predetermined values, e.g., 1. The value of the waveform equation for values within the bit interval is obtained by substituting the transmit data interval into Equation 11, thus yielding the equation:

$$e^{j\theta(kT+n\Delta)} = e^{j\frac{\pi}{2}\left\{\begin{array}{c}\alpha_{k-2}Q(2T+n\Delta)+\alpha_{k-1}Q(T+n\Delta)+\\ \alpha_k Q(n\Delta)+\alpha_{k+1}Q(-T+n\Delta)+\\ \alpha_{k+2}Q(-2T+n\Delta)\end{array}\right\}} \cdot b_k = \quad (12)$$

$$e^{j\theta(kT+n\Delta)} = e^{j\frac{\pi}{2}\{\theta'\}} \cdot b_k = (\cos\theta' + j\sin\theta') \cdot b_k,$$

where the cosine term represents the in-phase component (I), and the sine term represents the quadrature component (Q). The in-phase and quadrature terms are mixed to generate the modulated waveform. The integer multiplier, n, represents the number of samples per bit interval used to generate the transmitted signal, and the interval $\Delta$ represents the time interval between adjacent transmit samples within a bit interval.

Figure 3:
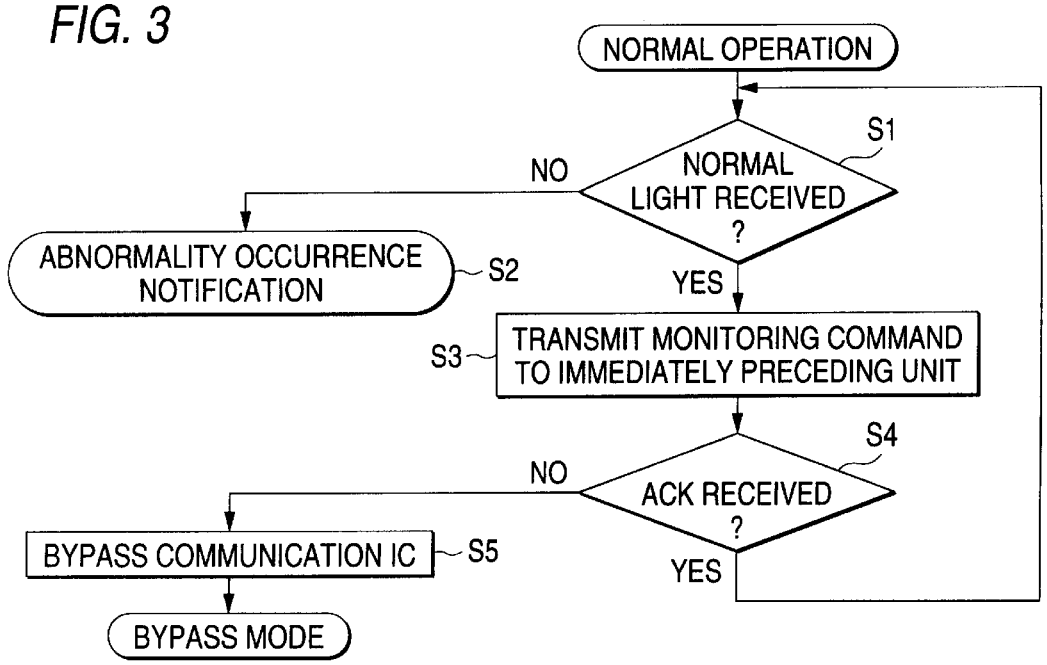
FIG. 3 is a block diagram of the signal modulator of FIG. 1.
Figure 1:
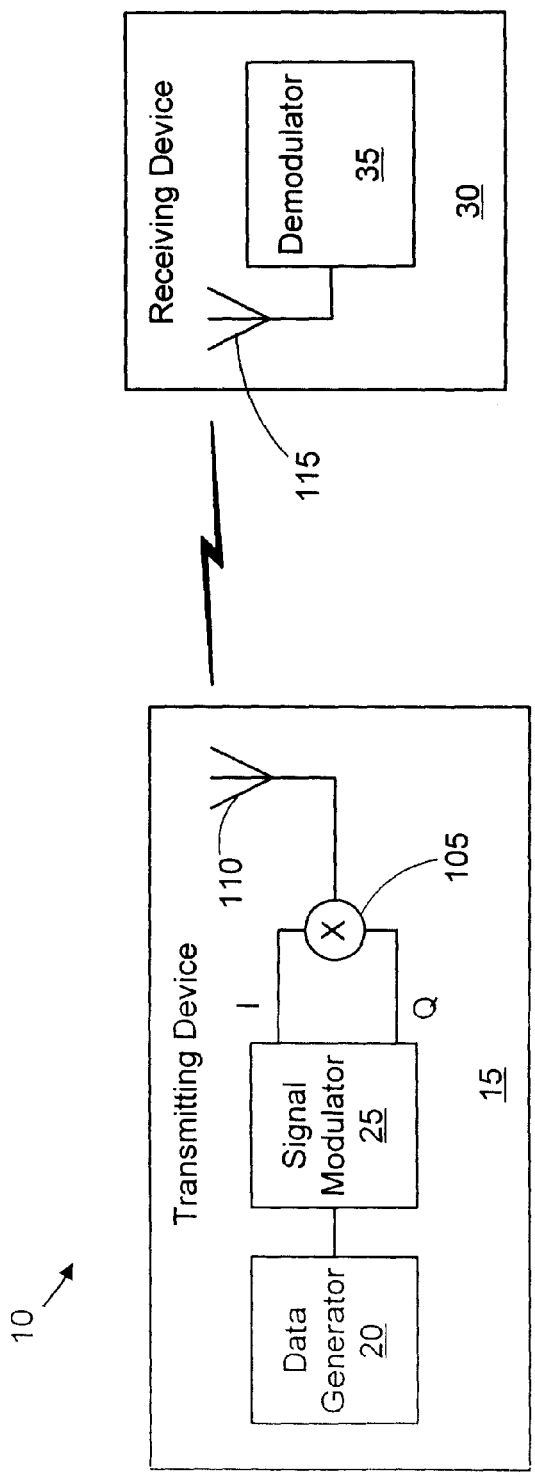
Figure 2:
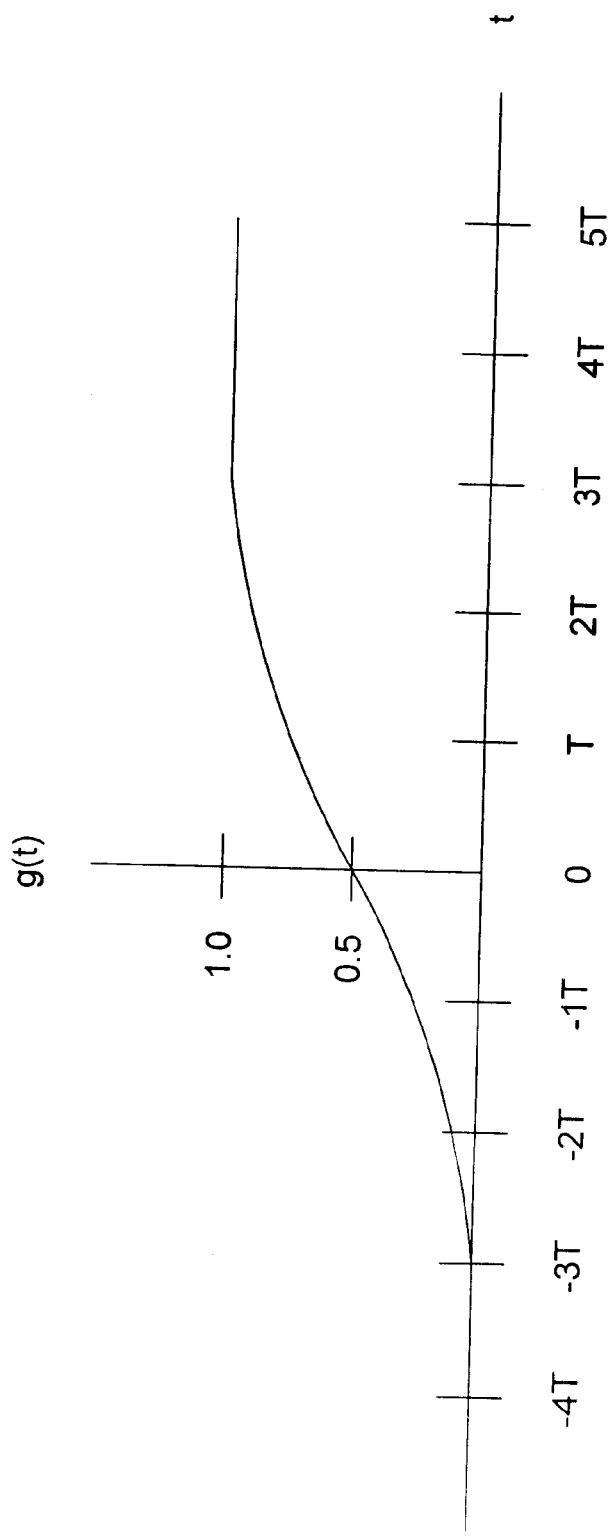
Figure 3:
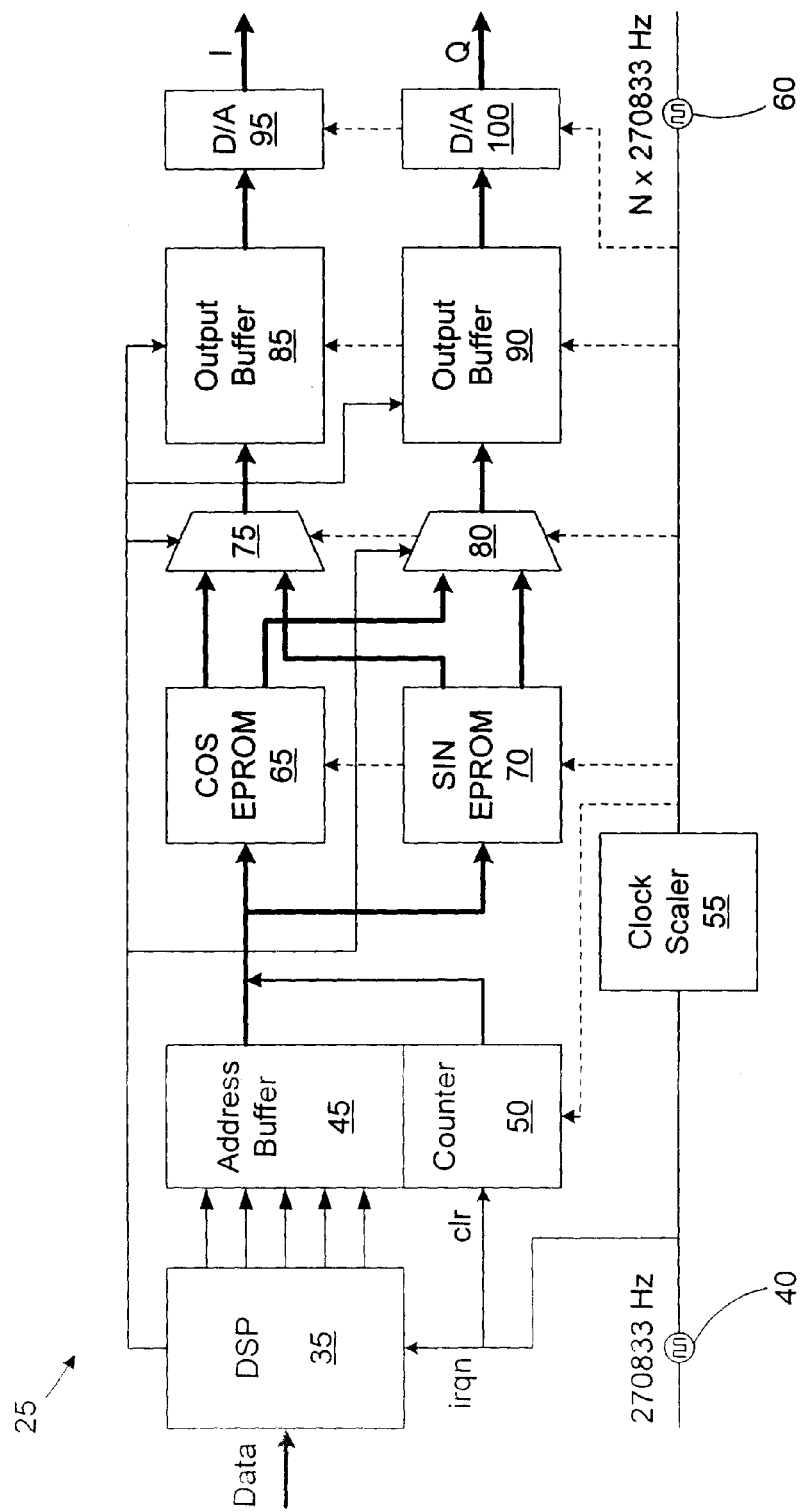

Referring to FIG. 3, a block diagram of the signal modulator 25 is provided. The signal modulator 25 includes a digital signal processor (DSP) 35 adapted to receive a digital data stream from the data generator 20. The DSP 35 may be any type of general processor (not shown), microprocessor (not shown), or limited function processor (not shown), depending on the specific implementation. In the illustrated embodiment, the DSP 35 is a general purpose processor, such as an ADI 2181, offered by Analog Devices, Inc. of Norwood, Mass., that performs a bit packing function on the incoming data. The DSP 35 is synchronized with the digital data by a receive clock signal 40. The data is provided to the DSP 35 at the frequency of the receive clock 40. The receive clock signal 40 is used to interrupt the DSP 35. In the illustrated embodiment, the frequency of the receive clock signal 40 is 156.25 digital bits per 577 microseconds or 270833 Hz. The carrier frequency is between about 825 MHz and 925 MHz.

The DSP 35 is coupled to an address buffer 45. The receive clock signal 40 also provides a clear signal (clr) to a counter 50. The receive clock signal 40 is coupled to a clock scaler 55. The output terminal of the clock scaler 55 is the transmit clock signal 60, which has a frequency equal to an integer multiple of the receive clock signal 40. In the illustrated embodiment, the clock scaler 55 may multiply the receive clock signal 40 to generate the transmit clock signal 60, or alternatively, the clock scaler 55 may receive the transmit clock signal 60 and divide the transmit clock signal 60 to generate the receive clock signal 40. Dividing the transmit clock signal 60 results in fewer digital components than required for clock multiplication. The integer multiple by which the receive clock signal 40 is multiplied corresponds to the number of samples per bit interval, n, in Equation 12.

The DSP 35 provides a 5-bit code word to the address buffer 45 representative of the last five bits of the digital bit stream. The base address from the address buffer 45 and the address offset from the counter 50 are combined to provide an address to access a COS EPROM 65 and a SIN EPROM 70. The COS EPROM 65 and the SIN EPROM 70 contain the values of the transmit waveform samples defined by Equations 1 and 12, depending on the values of the digital data corresponding to the code word from the DSP 35. The code word has 32 possible values (binary 00000 to binary 11111). Each possible code word is mapped to a base address of a block of n memory cells within the COS EPROM 65 and the SIN EPROM 70.

The counter 50 is cleared by the receive clock signal 40 at the start of each bit interval. The counter 50 is incremented by the transmit clock signal 60 throughout the bit interval to provide n transmit samples. Thus, the address supplied to the COS and SIN EPROMS 65, 70 is incremented from the code word to the code word plus n over the bit interval.

The output signals of the COS and SIN EPROMS 65, 70 are coupled to multiplexers 75, 80. Each multiplexer 75, 80 is coupled to each of the COS and SIN EPROM 65, 70 output terminals. The multiplexers 75, 80 are coupled to output buffers 85, 90. The output buffers 85, 90 can be configured to provide either a normal output signal or an inverted output signal based on a control signal. The output buffers 85, 90 are coupled to digital to analog (D/A) converters 95, 100. The output signal of the D/A converter 95 is the in-phase component of the transmit waveform, and the output signal of the D/A converter 100 is the quadrature component of the transmit wave form. The EPROMS 65, 70, multiplexers 75, 80, output buffers 85, 90, and D/A converters 95, 100 are clocked by the transmit clock signal 60. The connections to the transmit clock signal 60 are shown as dashed lines to distinguish the transmit clock signal 60 connections from the other data and control signal connections.

The multiplexers 75, 80 and output buffers 85, 90 are controlled by the DSP 35 in accordance with the complex scaling factor, $b_k$ defined by Equation 11. As described above, the value of the complex scaling factor can be one of 1, −1, j, or −j. The output buffers 85, 90 are controlled by the DSP 35 based on the sign of $b_k$. As a result, if $b_k$=−1 or −j, the output buffer 85, 90 are controlled to provide inverted output signals. Otherwise, the output buffers 85, 90 are controlled to provide non-inverted output signals. The multiplexers 75, 80 are controlled by the complex component of $b_k$. If $b_k$=j or −j, the multiplexer 80 is aligned to the COS EPROM 65, the multiplexer 75 is aligned to the SIN EPROM 70 (i.e. in-phase comes from SIN EPROM 70 and quadrature comes from COS EPROM 65). Otherwise, the multiplexer 75 is aligned to the COS EPROM 65, and the multiplexer 80 is aligned to the SIN EPROM 70 (i.e. in-phase comes from COS EPROM 65 and quadrature comes from SIN EPROM 70).

The value for $b_k$ is accumulated by the DSP 35 from $2^{nd}$ bit interval to the $k^{th}$ interval. For each new bit, the DSP 35 multiplies its previous $b_k$ by the next $\alpha_i$ and j to generate $b_k$ for the next bit interval. The DSP 35 generates a 2-bit control signal for the multiplexers 75, 80 and the output buffers 85, 90 based on the value of $b_k$.

Returning to FIG. 1, the in-phase and quadrature components from the D/A converters 95, 100 are mixed in a mixer 105 to provide the transmit waveform, which is provided to an antenna 110 for transmission. The transmitted waveform modulated with the digital data is received by the receiving device 30 through an antenna 115 and provided to the demodulator 35 for reconstructing the digital data.

As described above, the COS and SIN EPROMS 65, 70 are programmed with data values for the code word combinations based on the transmit sampling rate (i.e., n samples per bit interval). To improve accuracy, the values may be computed using floating point calculations and truncated based on the data width of the EPROMS 65, 70, buffers 85, 90, and D/A converters 95, 100 (e.g., 8-bits).

In the illustrated embodiment, the EPROMS 65, 70 are programmed and partitioned for a particular value of n. It is contemplated that the size of the EPROMS 65, 70 may be increased to hold waveform values for a number of transmit sampling frequencies (i.e., multiple values of n). Accordingly, the DSP 35 or other device (not shown) may be programmed to offset the address generated by the address buffer 45/counter 50 combination based on the value of n selected. It is also contemplated that a dynamic memory device (not shown) may be used in place of the EPROMS 65, 70, such that the waveform values could be dynamically calculated and stored by the DSP 35 or another processing device (not shown).

For added clarity, the operation of the signal modulator 25 is illustrated by example. Consider a transmit sampling rate of 64 samples per bit interval (i.e., n=64). The transmit sampling frequency based on the receive clock signal 40 frequency of 270833, is 64*270833, or 17.33333312. The DSP provides the incoming code word to the address buffer 45 slightly before the of the receive clock signal 40.

The code word from the DSP 35 is used to generate the base address in the address buffer EPROMS 65, 70 as illustrated in Table 1.

TABLE 1

EPROM Memory Mapping

| Bit4 | Bit3 | Bit2 | Bit1 | Bit0 | Memory Assignment (Each block = 64 samples) |
|------|------|------|------|------|---------------------------------------------|
| 0 | 0 | 0 | 0 | 0 | 0x000-0x03f |
| 0 | 0 | 0 | 0 | 1 | 0x040-0x07f |
| 0 | 0 | 0 | 1 | 0 | 0x080-0x0bf |
| 0 | 0 | 0 | 1 | 1 | 0x0c0-0x0ff |
| 0 | 0 | 1 | 0 | 0 | 0x100-0x13f |
| 1 | 1 | 1 | 1 | 0 | 0x780-0x7bf |
| 1 | 1 | 1 | 1 | 1 | 0x7c0-0x7ff |

The receive clock signal 40 starts each bit interval by providing an interrupt (irqn) to the DSP 35 and clearing the counter 50. The address offset stored in the counter 50 is incremented throughout the bit interval by the transmit clock signal 60 at the rate of 17.333312 MHz. The DSP 35 accumulates the complex scaling factor as described above and controls the multiplexers 75, 80 and output buffers 85, 90 with the 2-bit control signal accordingly. The DSP 35 sets the 2-bit control signal at the start of each bit interval. The in-phase and quadrature components I, Q are supplied by the D/A converters 95, 100. The modulated output signal from the transmitting device 15 is generated by mixing the in-phase and quadrature components I, Q.

An advantage of the signal modulator 25 described above is that the transmit sampling rate does not affect the operation of the DSP 35. If the sampling rate is changed, the EPROMS 65, 70 are updated with the new waveform sample values using the same memory block assignments shown in Table 1. Only the integer multiplier for the clock scaler 55 is adjusted to provide the proper clock frequencies. Also, because the DSP 35 only provides data coincident with the receive clock signal 40, its processing burden is reduced as compared to another system where the DSP (not shown) provides information throughout the bit interval. The signal modulator 25 of the present invention is readily changed to support different operating parameters, without requiring extensive, and thus expensive, hardware reconfigurations.

The particular embodiments disclosed above are illustrative only, as the invention may be modified and practiced in different but equivalent manners apparent to those skilled in the art having the benefit of the teachings herein.

Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

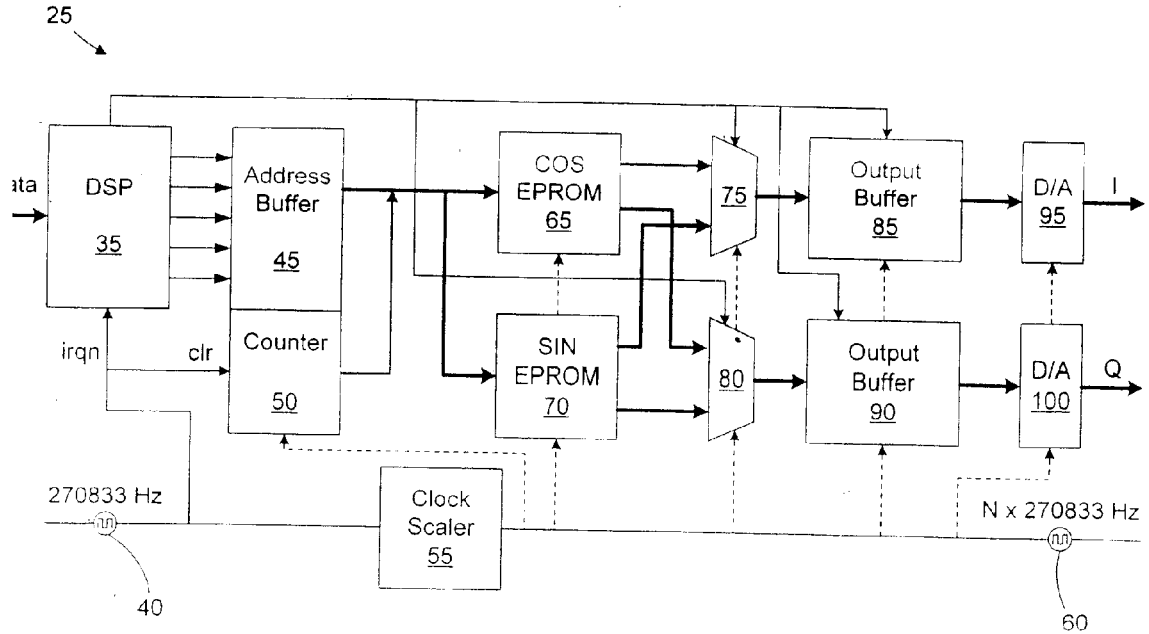

What is claimed is:

1. A signal modulator, comprising:
   a digital signal processor adapted to receive digital data at a receive sampling rate and define a code word based on a subset of the digital data;
   an address buffer coupled to the digital signal processor and adapted to receive the code word and store a base address;
   a counter adapted to increment an address offset at a transmit sampling rate, the transmit sampling rate being a multiple of the receive sampling rate; and
   a first memory device having a plurality of memory locations and adapted to receive the base address and the address offset and provide a first waveform data sample from the memory location addressed by the base address and the address offset.

2. The signal modulator of claim 1, further comprising a second memory device having a plurality of memory locations and adapted to receive the base address and the address offset and provide a second waveform data sample from the memory location addressed by the base address and the address offset.

3. The signal modulator of claim 2, wherein the second waveform data sample comprises a sine waveform data sample.

4. The signal modulator of claim 2, further comprising a first multiplexer coupled to the first and second memory devices.

5. The signal modulator of claim 4, further comprising a first output buffer coupled to the first multiplexer, the first output buffer being capable of providing a non-inverted output signal and an inverted output signal.

6. The signal modulator of claim 5, further comprising a first digital to analog converter coupled to the first output buffer and adapted to provide a first analog output signal.

7. The signal modulator of claim 6, wherein the first analog output signal comprises an in-phase waveform component.

8. The signal modulator of claim 6, further comprising:
   a second multiplexer coupled to the first and second memory devices;
   a second output buffer coupled to the second multiplexer, the second output buffer being capable of providing a non-inverted output signal and an inverted output signal; and
   a second digital to analog converter coupled to the second output buffer and adapted to provide a second analog output signal.

9. The signal modulator of claim 8, wherein the second analog output signal comprises a quadrature waveform component.

10. The signal modulator of claim 8, wherein the digital signal processor is further adapted to calculate a complex scaling factor based on the digital data and provide a control signal to the first and second multiplexers and the first and second output buffers based on the complex scaling factor, the first and second multiplexers are adapted to select between the first and second memory devices based on the control signal, and the first and second output buffers are adapted to provide one of the non-inverted and inverted output signals based on the control signal.

11. The signal modulator of claim 5, wherein the digital signal processor is further adapted to calculate a complex scaling factor based on the digital data and provide a control signal to the first output buffer based on the complex scaling factor, and the first output buffer is adapted to provide one of the non-inverted and inverted output signals based on the control signal.

12. The signal modulator of claim 4, wherein the digital signal processor is further adapted to calculate a complex scaling factor based on the digital data and provide a control signal to the first multiplexer based on the complex scaling factor, and the first multiplexer is adapted to select between the first and second memory devices based on the control signal.

13. The signal modulator of claim 1, wherein the first waveform data sample comprises a cosine waveform data sample.

14. The signal modulator of claim 1, further comprising a receive clock signal having a frequency corresponding to the receive sampling rate, wherein the receive clock signal is coupled to the digital signal processor to provide an interrupt signal, and the receive clock signal is coupled to the counter to provide a clear signal.

15. The signal modulator of claim 1, further comprising a transmit clock signal having a frequency corresponding to the transmit sampling rate, wherein the transmit clock signal is coupled to the counter for incrementing the counter at the transmit sampling rate.

16. The signal modulator of claim 15, wherein the first memory device has a clock input coupled to the transmit clock signal.

17. The signal modulator of claim 1, further comprising a clock scaler adapted to receive one of a receive clock signal and a transmit clock signal and provide the other of the receive clock signal and the transmit clock signal, wherein the frequency of the transmit clock signal is an integer multiple of the frequency of the receive clock signal.

18. An apparatus for transmitting a signal, comprising:
   a data generator adapted to provide digital data; and
   a signal modulator adapted to receive the digital data, wherein the signal modulator includes:
      a digital signal processor adapted to receive digital data at a receive sampling rate and define a code word based on a subset of the digital data;
      an address buffer coupled to the digital signal processor and adapted to receive the code word and store a base address;
      a counter adapted to increment an address offset at a transmit sampling rate, the transmit sampling, rate being a multiple of the receive sampling rate; and
      a first memory device having a plurality of memory locations and adapted to receive the base address and the address offset and provide a first waveform data sample from the memory location addressed by the base address and the address offset.

19. The apparatus of claim 18, further comprising a second memory device having a plurality of memory locations and adapted to receive the base address and the address offset and provide a second waveform data sample from the memory location addressed by the base address and the address offset.

20. The apparatus of claim 19, wherein the second waveform data sample comprises a sine waveform data sample.

21. The apparatus of claim 19, further comprising a first multiplexer coupled to the first and second memory devices.

22. The apparatus of claim 21, further comprising a first output buffer coupled to the first multiplexer, the first output buffer being capable of providing a non-inverted output signal and an inverted output signal.

23. The apparatus of claim 22, further comprising a first digital to analog converter coupled to the first output buffer and adapted to provide a first analog output signal.

24. The apparatus of claim 23, wherein the first analog output signal comprises an in-phase waveform component.

25. The apparatus of claim 23, further comprising:
a second multiplexer coupled to the first and second memory devices;
a second output buffer coupled to the second multiplexer, the second output buffer being capable of providing a non-inverted output signal and an inverted output signal; and
a second digital to analog converter coupled to the second output buffer and adapted to provide a second analog output signal.

26. The apparatus of claim 25, wherein the second analog output signal comprises a quadrature waveform component.

27. The apparatus of claim 25, wherein the digital signal processor is further adapted to calculate a complex scaling factor based on the digital data and provide a control signal to the first and second multiplexers and the first and second output buffers based on the complex scaling factor, the first and second multiplexers are adapted to select between the first and second memory devices based on the control signal, and the first and second output buffers are adapted to provide one of the non-inverted and inverted output signals based on the control signal.

28. The apparatus of claim 22, wherein the digital signal processor is further adapted to calculate a complex scaling factor based on the digital data and provide a control signal to the first output buffer based on the complex scaling factor, and the first output buffer is adapted to provide one of the non-inverted and inverted output signals based on the control signal.

29. The apparatus of claim 21, wherein the digital signal processor is further adapted to calculate a complex scaling factor based on the digital data and provide a control signal to the first multiplexer based on the complex scaling factor, and the first multiplexer is adapted to select between the first and second memory devices based on the control signal.

30. The apparatus of claim 18, wherein the first waveform data sample comprises a cosine waveform data sample.

31. The apparatus of claim 18, further comprising a receive clock signal having a frequency corresponding to the receive sampling rate, wherein the receive clock signal is coupled to the digital signal processor to provide an interrupt signal, and the receive clock signal is coupled to the counter to provide a clear signal.

32. The apparatus of claim 18, further comprising a transmit clock signal having a frequency corresponding to the transmit sampling rate, wherein the transmit clock signal is coupled to the counter for incrementing the counter at the transmit sampling rate.

33. The apparatus of claim 32, wherein the first memory device has a clock input coupled to the transmit clock signal.

34. The apparatus of claim 18, further comprising a clock scaler adapted to receive one of a receive clock signal and a transmit clock signal and provide the other of the receive clock signal and the transmit clock signal, wherein the frequency of the transmit clock signal is an integer multiple of the frequency of the receive clock signal.

35. An apparatus, comprising:
means for receiving digital data at a receive sampling rate;
means for determining a code word based on a subset of the digital data, the code word defining an address;
means for generating an address offset based on a transmit sampling rate; and
means for outputting a first waveform data sample based on the address and the address offset.

36. A method for modulating a signal, comprising:
receiving digital data at a receive sampling rate, the time interval between digital data samples defining a bit interval;
determining a code word based on a subset of the digital data;
initializing a counter at the start of the bit interval;
incrementing the counter at a transmit sampling rate;
determining an address based on the code word and an address offset stored in the counter;
accessing a first memory device containing waveform data based on the address; and
outputting a first waveform data sample from the first memory device.

37. The method of claim 36, further comprising:
determining a complex scaling factor based on the digital data; and
inverting the first waveform sample based on the complex scaling factor.

38. The method of claim 36, further comprising:
accessing a second memory device containing waveform data based on the address; and
outputting a second waveform data sample from the second memory device.

39. The method of claim 38, further comprising:
determining a complex scaling factor based on the digital data; and
inverting the first and second waveform samples based on the complex scaling factor.

40. The method of claim 38, further comprising:
determining a complex scaling factor based on the digital data;
selecting one of the first and second waveform samples based on the complex scaling factor to generate an in-phase waveform component; and
selecting the other of the first and second waveform samples based on the complex scaling factor to generate an quadrature waveform component.

41. The method of claim 40, wherein generating the in-phase waveform component includes converting the selected one of the first and second waveform samples to an analog waveform signal.

42. The method of claim 40, wherein generating the quadrature waveform component includes converting the other of the first and second waveform samples to an analog waveform signal.

43. The method of claim 40, further comprising mixing the in-phase waveform component with the quadrature waveform component to generate a modulated waveform signal.

44. The method of claim 43, further comprising transmitting the modulated waveform signal.

* * * * *

UNITED STATES PATENT AND TRADEMARK OFFICE
CERTIFICATE OF CORRECTION

PATENT NO. : 6,151,366
DATED : November 21, 2000
INVENTOR(S) : Philip Chu Wah Yip It is certified that error appears in the above-identified patent and that said Letters Patent is hereby corrected as shown below:

The title page should be deleted and substitute the attached title page as shown on the attached page.

Delete Drawing Sheets 1-3, and substitute the Drawing Sheets, consisting of Figs. 1-3, as shown on the attached pages.

Signed and Sealed this

Twenty-eighth Day of February, 2006

JON W. DUDAS
*Director of the United States Patent and Trademark Office*

United States Patent [19]
Yip

[11] Patent Number: 6,151,366
[45] Date of Patent: Nov. 21, 2000

[54] METHOD AND APPARATUS FOR MODULATING SIGNALS

[75] Inventor: Philip Chu Wah Yip, Austin, Tex.

[73] Assignee: Advanced MicroDevices, Inc., Austin, Tex.

[21] Appl. No.: 09/062,253

[22] Filed: Apr. 17, 1998

[51] Int. Cl.$^7$ .................................................. H04L 27/12
[52] U.S. Cl. ........................................ 375/305; 332/100
[58] Field of Search ................................ 375/295, 309, 375/305, 303, 302, 274; 332/100

[56] References Cited

U.S. PATENT DOCUMENTS

| | | | |
|---|---|---|---|
| 3,988,674 | 10/1976 | Sciulli | 370/505 |
| 4,466,029 | 8/1984 | Tanaka | 360/72.2 |
| 5,602,848 | 2/1997 | Andrews et al. | 370/465 |
| 5,611,075 | 3/1997 | Garde | 711/153 |
| 5,778,024 | 7/1998 | McDonough | 375/216 |

OTHER PUBLICATIONS

"A 270-kb/s 35-m W Modulator IC for GSM Cellular Radio hand–Held Terminals", by Johan J. J. Haspeslagh, Danny Sallaerts, Peter P. Reusens, Arnoul Vanwelsenaers, R. Granek, and Dirk Rabaey, IEEE Journal of Solid–State Circuits, vol. 25, No. 6, Dec. 1990.

"Efficient Implementation of an I–Q GMSK Modulator", by Alfredo Linz & Alan Hendrickson, IEE Transactions on Circuits and Systems—II: Analog and Digital Signal Processing, vol. 43, No. 1, Jan. 1, 1996.

Primary Examiner—Stephen Chin
Assistant Examiner—Lenny Jiang
Attorney, Agent, or Firm—Williams, Morgan & Amerson, P.C.

[57] ABSTRACT

A signal modulator includes a digital signal processor, an address buffer, a counter, and a first memory device. The digital signal processor is adapted to receive digital data at a receive sampling rate and define a code word based on a subset of the digital data. The address buffer is coupled to the digital signal processor and adapted to receive the code word and store a base address. The counter is adapted to increment an address offset at a transmit sampling rate. The transmit sampling rate is a multiple of the receive sampling rate. The first memory device has a plurality of memory locations and is adapted to receive the base address and the address offset and provide a first waveform data sample from the memory location addressed by the base address and the address offset. A method for modulating a signal includes receiving digital data at a receive sampling rate. The time interval between digital data samples defines a bit interval. A code word is determined based on a subset of the digital data. A counter is initialized at the start of the bit interval. The counter is incremented at a transmit sampling rate. An address is determined based on the code word and an address offset stored in the counter. A first memory device containing waveform data is accessed based on the address. A first waveform data sample is output from the first memory device.

44 Claims, 2 Drawing Sheets